US012576553B2

(12) United States Patent
Diver

(10) Patent No.: US 12,576,553 B2
(45) Date of Patent: Mar. 17, 2026

(54) CELLULAR CONCRETE WET MIX BLENDING

(71) Applicant: ConsTruc Industries, LLC, Grove, OK (US)

(72) Inventor: James Diver, Grove, OK (US)

(73) Assignee: CONSTRUC INDUSTRIES, LLC, Grove, OK (US)

( * ) Notice: Subject to any disclaimer, the term of this patent is extended or adjusted under 35 U.S.C. 154(b) by 897 days.

(21) Appl. No.: 17/227,144

(22) Filed: Apr. 9, 2021

(65) Prior Publication Data

US 2021/0316475 A1 Oct. 14, 2021

Related U.S. Application Data

(60) Provisional application No. 63/008,306, filed on Apr. 10, 2020.

(51) Int. Cl.
*B28C 5/38* (2006.01)
*B28C 5/02* (2006.01)
(Continued)

(52) U.S. Cl.
CPC .............. *B28C 5/388* (2013.01); *B28C 5/02* (2013.01); *B28C 7/0413* (2013.01);
(Continued)

(58) Field of Classification Search
CPC ................................. B28C 5/388; B28C 5/02
See application file for complete search history.

(56) References Cited

U.S. PATENT DOCUMENTS 2,664,277 A * 12/1953 Davies .................... B01F 25/50
366/27
2,733,053 A * 1/1956 Dugas .................... B28C 5/386
366/35
(Continued)

FOREIGN PATENT DOCUMENTS

AU 2016100927 A4 7/2016
CN 104416678 A * 3/2015 ............ B28C 5/381
(Continued)

OTHER PUBLICATIONS

International Search Report mailed on Sep. 1, 2021 for Application No. PCT/US2021/026706.
(Continued)

*Primary Examiner* — Claire X Wang
*Assistant Examiner* — Patrick M McCarty
(74) *Attorney, Agent, or Firm* — HOLZER PATEL DRENNAN

(57) ABSTRACT

Cellular concrete is formed from a cement-based wet mix slurry with a foam entrained into the wet mix. The foam is created using a foaming agent, mixed with water and air using a foam generator. The wet mix is mixed with the foam to form the cellular concrete wet mix. Poor component metering and blending practices in the current state of the art limits the performance capabilities of existing cellular concrete placements. The presently disclosed technology addresses this with a cellular concrete mixing system comprising a dry mix hopper to store a quantity of dry mix, a mixing tank to blend the dry mix and water together to form a wet mix, a holding tank to store a quantity of the wet mix, a foam generator to generate foam from air, water, and foam concentrate, and a blend controller to control operation of the overall mixing system.

20 Claims, 4 Drawing Sheets

(51) Int. Cl.
    *B28C 7/04*        (2006.01)
    *C04B 28/02*     (2006.01)
    *C04B 38/10*     (2006.01)
    *C04B 40/00*     (2006.01)

(52) U.S. Cl.
    CPC .......... *B28C 7/0418* (2013.01); *B28C 7/0445* (2013.01); *C04B 28/02* (2013.01); *C04B 38/10* (2013.01); *C04B 40/0042* (2013.01)

(56) References Cited

U.S. PATENT DOCUMENTS

| | | | | |
|---|---|---|---|---|
| 3,177,281 | A | | 4/1965 | Harold |
| 3,625,724 | A * | 12/1971 | Alvero | C04B 38/00 366/604 |
| 4,007,921 | A * | 2/1977 | Zingg | B01F 35/833 366/136 |
| 4,227,893 | A * | 10/1980 | Shaddock | B60P 1/60 55/315 |
| 5,046,855 | A * | 9/1991 | Allen | E21B 33/13 366/65 |
| 5,102,228 | A | | 4/1992 | Vine-Lott |
| 5,522,658 | A * | 6/1996 | John | B28C 7/0422 366/18 |
| 5,570,953 | A * | 11/1996 | DeWall | B28C 9/004 366/38 |
| 5,795,060 | A * | 8/1998 | Stephens | B01F 35/883 366/8 |
| 5,813,754 | A * | 9/1998 | Williams | B01F 31/56 366/65 |
| 5,871,677 | A * | 2/1999 | Falke | C04B 28/18 264/43 |
| 6,046,255 | A | | 4/2000 | Gray et al. |
| 6,369,121 | B1 * | 4/2002 | Catalfamo | C10L 1/328 521/64 |
| 7,464,757 | B2 * | 12/2008 | Pessin | B01F 33/812 366/14 |
| 8,491,687 | B1 * | 7/2013 | Wann | B01D 46/48 166/308.1 |
| 9,695,670 | B2 * | 7/2017 | Ayo | B01F 25/721 |
| 10,472,292 | B1 | | 11/2019 | Ashley et al. |
| 10,946,553 | B1 * | 3/2021 | Lanclos | B01F 35/189 |
| 2002/0001255 | A1 * | 1/2002 | Flood | B28C 9/004 366/50 |
| 2002/0093875 | A1 * | 7/2002 | Rondeau | B01F 35/21 366/136 |
| 2007/0257392 | A1 | | 11/2007 | Etherton |
| 2008/0101151 | A1 * | 5/2008 | Frank | B28C 5/1284 366/35 |
| 2014/0373755 | A1 * | 12/2014 | Forgeron | B28C 5/4203 106/638 |
| 2015/0266206 | A1 * | 9/2015 | Arbour | B01F 25/64 241/15 |
| 2016/0107132 | A1 * | 4/2016 | Igo | B28C 9/0454 366/8 |
| 2018/0251324 | A1 * | 9/2018 | Sucre | B65G 69/06 |
| 2019/0121353 | A1 | | 4/2019 | Datema et al. |
| 2019/0234356 | A1 * | 8/2019 | Avireddi | F02M 35/10144 |
| 2020/0016789 | A1 * | 1/2020 | Ashley | B01F 35/2134 |
| 2021/0213641 | A1 * | 7/2021 | Gawryck | B01F 35/2115 |
| 2021/0238105 | A1 * | 8/2021 | Krasnoff | C04B 28/02 |

FOREIGN PATENT DOCUMENTS

| | | | |
|---|---|---|---|
| CN | 106738342 | A | 5/2017 |
| DE | 4327074 | A1 | 2/1995 |
| GB | 1596200 | A | 8/1981 |
| KR | 100903275 | B1 * | 6/2009 |
| KR | 101272626 | B1 | 6/2013 |
| KR | 101551896 | B1 * | 6/2015 |
| KR | 102030489 | B1 | 10/2019 |
| NL | 9302111 | A | 7/1995 |
| WO | 8202358 | A1 | 7/1982 |

OTHER PUBLICATIONS

Aercrete FG-6 Product Description, <URL: https://www.aercrete.se/en/aercrete-fg-6-2/> Retrieved from the Internet on Oct. 15, 2021.

DeckMate Product Description, <URL: https://static1.squarespace.com/static/5a0215e764b05fc4bbf18ced/t/5c784e8a9b747a5a7f5f7c43/1551388298836/Deckmate.pdf> Retrieved from the Internet on Oct. 15, 2021.

The Aercrete System, Mobile production of foam concrete, <URL: http://aercrete.se/wp-content/uploads/Info_ENG_web.pdf> Retrieved from the Internet on Oct. 15, 2021.

CF-CT100 Series Brochure, <URL: https://www.richway.com/images/construction/products/ct-100d/MACHINES_-_CF-CT100series_1821email.pdf> Retrieved from the Internet on Oct. 15, 2021.

* cited by examiner

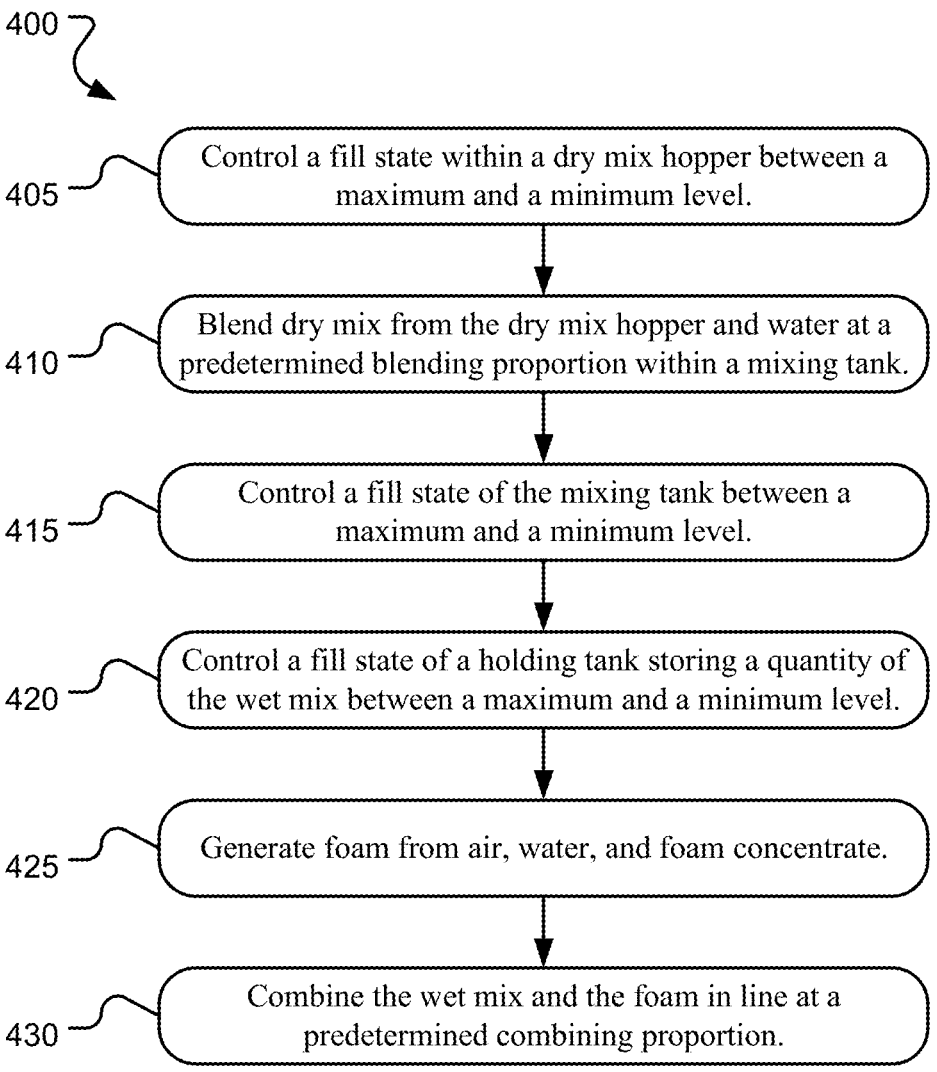

400

405 — Control a fill state within a dry mix hopper between a maximum and a minimum level.

410 — Blend dry mix from the dry mix hopper and water at a predetermined blending proportion within a mixing tank.

415 — Control a fill state of the mixing tank between a maximum and a minimum level.

420 — Control a fill state of a holding tank storing a quantity of the wet mix between a maximum and a minimum level.

425 — Generate foam from air, water, and foam concentrate.

430 — Combine the wet mix and the foam in line at a predetermined combining proportion.

FIG. 4

CELLULAR CONCRETE WET MIX BLENDING

CROSS-REFERENCE TO RELATED APPLICATIONS

The present application claims benefit of priority to U.S. Provisional Patent Application No. 63/008,306 entitled "Cellular Concrete Wet Mix Blending" and filed on Apr. 10, 2020, which is specifically incorporated by reference herein for all that it discloses or teaches.

BACKGROUND

Cellular concrete (also known as foam concrete, lightweight cellular concrete (LCC), or low-density cellular concrete (LDCC)) is formed from a cement-based wet mix slurry, with a minimum of 20% (per volume) foam entrained into the wet mix. A concrete wet mix typically includes a slurry of cement and/or fly ash, as well as sand and water. This wet mix is mixed with a synthetic aerated foam in a cellular concrete blending system to form the cellular concrete wet mix. The foam is created using a foaming agent, mixed with water and air from a foam generator. The foaming agent produces air bubbles with a high level of stability, resistant to the physical and chemical processes of mixing, placing and curing the cellular concrete.

Poor component metering and blending practices limit the performance capabilities of existing cellular concrete placements.

SUMMARY

Implementations described and claimed herein address the foregoing problems by providing a cellular concrete wet mixing system comprising a dry mix hopper to store a quantity of dry mix, a mixing tank to blend the dry mix and water together to form a wet mix, a holding tank to store a quantity of the wet mix, a foam generator to generate foam from air, water, and foam concentrate, and a blend controller. The blend controller to control a fill state of the dry mix hopper between a maximum and a minimum level, define a blending proportion of the dry mix and the water within the mixing tank, control a fill state of the mixing tank between a maximum and a minimum level, control a fill state of the holding tank between a maximum and a minimum level, and define a blending proportion of the wet mix and the foam combined in-line to generate a foamed wet mix.

Implementations described and claimed herein address the foregoing problems by further providing a method of operating a cellular concrete wet mixing system comprising controlling a fill state within a dry mix hopper between a maximum and a minimum level, blending dry mix from the dry mix hopper and water at a predetermined blending proportion within a mixing tank to form a wet mix, controlling a fill state of the mixing tank between a maximum and a minimum level, controlling a fill state of a holding tank storing a quantity of the wet mix between a maximum and a minimum level, generating foam from air, water, and foam concentrate, and combining the wet mix and the foam in line at a predetermined combining proportion to generate a foamed wet mix.

Implementations described and claimed herein address the foregoing problems by still further providing a cellular concrete wet mix comprising an array of foam bubbles suspended in the wet mix, greater than 90% of which are coated entirely in wet mix, and less than 10% of which are merged bubbles.

Other implementations are also described and recited herein.

BRIEF DESCRIPTIONS OF THE DRAWINGS

FIG. 4 illustrates example operations for operating a cellular concrete wet mixing system according to the presently disclosed technology.

DETAILED DESCRIPTIONS

Figure 1:
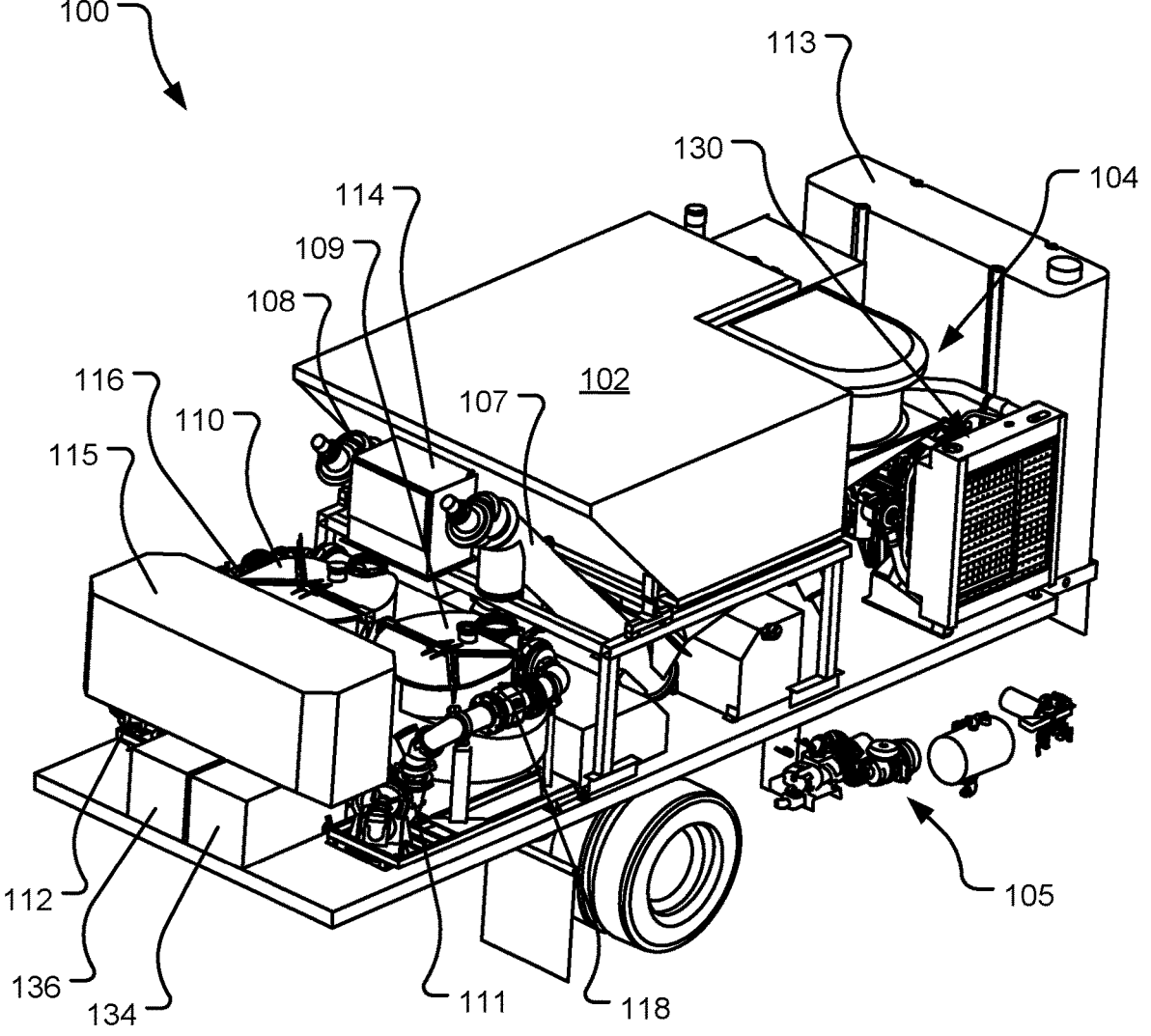
FIG. 1 illustrates a perspective view of an example cellular concrete wet mixing system according to the presently disclosed technology.

FIG. 1 illustrates a perspective view of an example cellular concrete wet mixing system 100 according to the presently disclosed technology. The system 100 includes a hopper 102 within which is at least dry cement powder. In some implementations, one or more dry additives (e.g., fly ash, sand, and/or aggregate) are mixed with the dry cement powder. The dry cement powder and any dry additives are referred to in total as a dry mix. The hopper 102 serves as an initial storage space for the dry mix within the system 100.

The dry mix is pumped into the hopper 102 (e.g., via pneumatic transfer) from a dry mix source (not shown, see e.g., dry mix source 201 of FIG. 2, such as a pneumatic tanker tractor trailer or rail car) via a dry mix input such as a four-inch (4") pipe connection within a quick connector. In other implementations, the hopper 102 may have an opening at its top from which it may be gravity-filled with the dry mix. In some implementations, the hopper 102 may be equipped with a pair of inputs (e.g., a pair of pipe connections, one located on driver-side and the other located on a passenger-side of the system 100), where the hopper 102 can be fed from either of the inputs and an associated connected dry mix source or both inputs simultaneously from two connected dry mix sources.

The hopper 102 may include a dust-containment system 104 oriented at the side of the hopper 102, as shown, to reduce the overall height requirement of the system 100 (as compared to dust-containment systems that are conventionally oriented on top of associated hoppers). In various implementations, the dust-containment system 104 includes an array of filtration bags or cartridges. The hopper 102 is under positive pressure while being pneumatically filled and dirty air passes through the bags/cartridges before exiting the dust-containment system 104 to make room within the hopper 102 for the input dry mix. In some implementations, a fan may be included within the dust-containment system 104 that pulls a vacuum on the hopper 102 through the bags/cartridges. Further, there may be a pressure relief valve included within the dust-containment system 104 to release air in the event of an over-pressurization of the hopper 102 (e.g., if the dust-containment system 104 is unable to discharge sufficient air to keep up with input dry mix, potentially caused by dirty bags/cartridges).

The dust-containment system 104 may include a mechanism to periodically clear collected dry mix from the bags/cartridges (e.g., a periodic pneumatic pulse or vibration mechanism). Air compressor and storage tank assembly 105 may provide compressed air for the periodic pneumatic pulse. The cleared dry mix falls to the bottom of the dust-containment system 104, and a screw conveyor (not shown, see e.g., dust-containment screw conveyor 206 of FIG. 2) transports the collected dry mix back to the hopper 102.

The hopper 102 may sit on hopper load cells (not shown, see e.g., hopper load cells 238 of FIG. 2) to monitor weight, which is equated to an approximate fill state of the hopper 102 based on a known weight per unit volume of the dry mix, a known empty weight of the hopper 102, and a volumetric capacity of the hopper 102. The fill state is monitored and controlled by a blend controller (not shown, see e.g., blend controller 240 of FIG. 2) to prevent overfill and empty conditions (e.g., the hopper 102 controlled to maintain a 5%-95% or 10%-90%, for example, fill state within the hopper 102). Dry mix may be added and/or withdrawn periodically or continuously, perhaps with variable rates, in a manner to keep the fill state within the predetermined range. In an example implementation, the hopper 102 has a 15,000 lbs. dry mix capacity (i.e., at a 100% fill state).

The system 100 includes a pair of hopper discharge screw conveyors 107, 108 at a discharge of the hopper 102 that selectively transport the dry mix from the hopper 102 to a pair of mixing tanks 109, 110, respectively. The mixing tanks 109, 110 and corresponding circulation pumps 111, 112 (e.g., centrifugal pumps) sit on mixing load cells (not shown, see e.g., mixing load cells 241 of FIG. 2) to monitor combined weight of the dry mix fed from the hopper 102 and water fed from a water tank 113 (e.g., a 500-gallon water tank) within the mixing tanks 109, 110. In some implementations, an external water source is provided in place of the water tank 113. The mixing tanks 109, 110 and corresponding pumps 111, 112 may be either run sequentially or simultaneously, but as independent pairings. Operation of the mixing tank 109 and the circulation pump 111 is described in detail below, with mixing tank 110 and pump 112 being the same.

The blend controller first actuates a solenoid valve to trigger filing of the mixing tank 109 with a desired quantity of water from the water tank 113 via a water pump (not shown, see e.g., water pump 242 of FIG. 2) or other water source. The blend controller determines the quantity of water that actually fills the mixing tank 109 once the filling stops based on a difference between the initial weight and a final weight of the tank 109/circulation pump 111 and a known weight per unit volume of the water using the mixing load cells. This ensures an accurate measurement of the actual quantity of water that was added to the mixing tank 109, which may vary somewhat from the desired quantity of water.

Once the mixing tank 109 is filled with the desired quantity of water (or as the mixing tank 109 is filled with water), the circulation pump 111 circulates the water within the tank 109. Specifically, an outlet of the circulation pump 111 is oriented along an inner wall of the mixing tank 109 and may include a nozzle that extends into the mixing tank 109 directing flow across a dry mix input into the mixing tank 109 from the screw conveyor 107. The circulation pump 111 outlet orientation causes a vortex action within the mixing tank 109 and the circulation pump 111 outlet position directing flow across the dry mix input from the screw conveyor 107 may cause a slight vacuum on the screw conveyor 107 outlet due to the venturi effect. As a result, the dry mix output from the screw conveyor 107 is introduced into the mixing tank 109 at a high velocity that aids in complete and consistent mixing of the dry mix with the water, minimization of dust creation at the point of interaction of the dry mix with the water, and minimization of dry mix buildup on interior surfaces of the mixing tank 109. In various implementations, the nozzle extending into the mixing tank 109 covers the dry mix input into the mixing tank 109 but includes an aperture within the nozzle in line with the dry mix input. This permits the dry mix output from the screw conveyor 107 to fall straight into the tank 109 rather than plug the nozzle should the water circulating within the tank 109 be interrupted (e.g., due to a failure of the circulation pump 111).

An actual measured water quantity added to the mixing tank 109 is used by the blend controller to calculate a desired quantity of dry mix to be added to the mixing tank 109 based on a desired mixing ratio (e.g., a 0.5 water to dry mix ratio, such as 300 pounds of water and 600 pounds of dry mix) for a desired wet mix. The screw conveyor 107 is then actuated by the blend controller to deliver the desired quantity of dry mix to the mixing tank 109. The mixing load cells determine the quantity of dry mix that actually fills the mixing tank 109 once the screw conveyor 107 stops, which may vary somewhat from the desired quantity of added dry mix. In various implementations, the screw conveyor 107 is controlled by the blend controller to input an actual quantity of dry mix that exceeds the desired mixing ratio by as small a quantity as possible to achieve at least a desired compressive strength of a resulting cellular concrete placement, but no less. In other implementations, if too much dry mix is input, the blend controller may call for a small quantity of additional water to be added to the mixing tank 109 to achieve the desired mixing ratio of the wet mix.

In various implementations, the blend controller is a programmable logic controller (PLC) that monitors the state of the mixing load cells both when filling the mixing tank 109 with water, and then subsequently filling the mixing tank 109 with dry mix. The blend controller includes a feedback control loop that operates the screw conveyor 107 until a target weight of the mixed slurry is reached and then the blend controller stops the screw conveyor 107.

Mixing dust containment system 114 is connected to the mixing tanks 109, 110 via flexible ductwork (not shown) and includes an array of filtration bags or cartridges to contain dust within the mixing tanks 109, 110. The mixing tanks 109, 110 are under positive pressure when being filled with water or dry mix and dirty air passes through the bags/cartridges before exiting the dust-containment system 114 to make room for the water/dry mix. In other implementations, a fan pulls a vacuum on the mixing tanks 109, 110 through the mixing dust containment system 114. The mixing dust containment system 114 may include a mechanism to periodically clear collected dry mix from the bags/cartridges (e.g., a periodic pneumatic pulse using compressed air from the air compressor and storage tank assembly 105 or a vibration mechanism). The cleared dry mix falls back into the mixing tanks 109, 110 via the same flexible ductwork.

Each of the circulation pumps 111, 112 includes an input from the bottom of the mixing tanks 109, 110, respectively, and an output that tees, one flow path leading to back to the mixing tanks 109, 110, respectively, and the other flow path leading to holding tank 115. Each of the four output flow paths are equipped with a shut-off valve (e.g., pinch valves 116, 118) that selectively stops the flow of fluid though that path. All of the circulation pumps 111, 112 and the shut-off valves are controlled by the blend controller depending on the desired mode of operation of the mixing tanks 109, 110 and associated pumps and valves.

For example, when operating in a recirculation mode, a shut-off valve leading from the circulation pump 111 to the mixing tank 109 is open, while a shut-off valve leading from the circulation pump 111 to the holding tank 115 is closed. When operating in a discharge mode, a shut-off valve leading from the circulation pump 111 to the mixing tank 109 is closed, while a shut-off valve leading from the circulation pump 111 to the holding tank 115 is open. In some implementations, to accurately measure the volume of material in the mixing tanks 109, 110 and the holding tank 115 and the transfer therebetween, only one shut-off valve leading from each of the circulation pumps 111, 112 may be open at a time.

In various implementations, the mixing tanks 109, 110 are not discharged completely to the holding tank 115 once a quantity of wet mix is batched as some wet mix is left in the mixing tanks 109, 110 to reduce potential cavitation in the circulation pumps 111, 112 when mixing water with new dry mix resumes to create a new batch of wet mix. Any remaining wet mix in the mixing tanks 109, 110 is disregarded by the blend controller in calculation of weight for the purposes of adding water and new dry mix to the mixing tanks 109, 110 to make the new batch of wet mix. The blend controller may direct maximum and minimum weight requirements for the mixing tanks 109, 110 to prevent overfilling and circulation pump cavitation, respectively. The minimum weight requirement may also indicate to the blend controller the presence of an insufficiently mixed portion of dry mix that was not sufficiently wetted and failed to pump out of the mixing tanks 109, 110. This will exceed the minimum weight requirement for restarting the mixing process for the new batch of wet mix and the blend controller will indicate an error. One or both of the mixing tanks 109, 110 may then require a cleaning operation, which may be user assisted and verified.

Each of the outputs of the screw conveyors 107, 108 are connected to the mixing tanks 109, 110, respectively, with flexible ductwork so as to not disrupt the mixing load cells that the mixing tanks 109, 110 sit on. Similarly, each of the outputs of the circulation pumps 111, 112 are connected to holding tank 115 with flexible ductwork so as to not disrupt the mixing load cells. Further still, the input/output of the dust containment system 114 is also connected to the mixing tanks 109, 110 with flexible ductwork so as to not disrupt the mixing load cells.

The holding tank 115 also sits on holding load cells (not shown, see e.g., holding load cells 244 of FIG. 2) to monitor weight of the wet mix fed from the mixing tanks 109, 110, and thus the state of fill of the holding tank 115. The blend controller also directs maximum and minimum weight requirements for the holding tank 115 to prevent overfilling and discharge pump cavitation, respectively, as well as detect a potential problem with filling and/or discharging the holding tank 115, as described above with reference to mixing tanks 109, 110. When the wet mix is ready to be discharged from the holding tank 115, it is pumped out using one or both of a pair of wet mix pumps 134, 136 (e.g., peristaltic pumps).

The cellular concrete wet mixing system 100 further includes a foam generator 130 that mixes a predetermined quantity of water, air, and a foam concentrate, and blends the three together to generate a pumpable, semi-stable foam. The proportions of water, air, and foam concentrate are closely metered by the blend controller to generate a consistent foam out of the foam generator 130. The generated foam is combined in-line with wet mix pumped out of the holding tank 115.

However, due to the foam being combined in-line with the wet mix, line pressure may vary substantially. As a result, the air used for the foam generator 130 may be metered with a mass-air meter to account for the compressibility of the air varying the quantity that is mixed with water and foam concentrate. In this calculation, the water and foam concentrate are assumed to be substantially incompressible materials within the projected line pressure, thus the flow meters for the water and foam concentrate may be volumetric (e.g., turbine or positive displacement flow meters).

Figure 2:
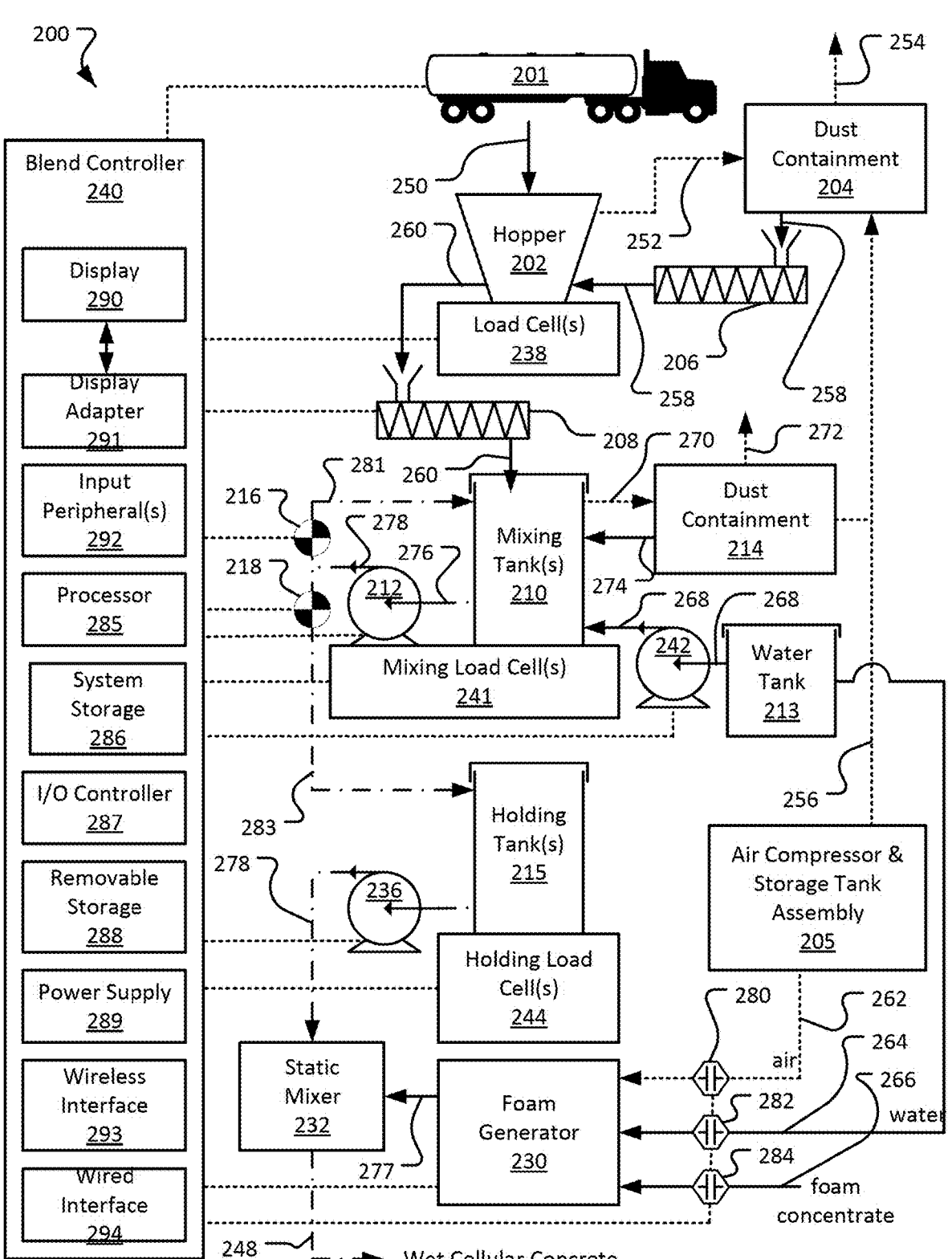
FIG. 2 illustrates an example cellular concrete wet mixing system schematic according to the presently disclosed technology.

In some implementations, the pumped wet mix is combined with the foam output from the foam generator 130 upstream of a static mixer (not shown, see e.g., static mixer 232 of FIG. 2). The unmixed wet mix and foam is pumped through the static mixer to achieve a uniformly mixed wet cellular concrete. In various implementations, the static mixer includes a helix or other obstructions to laminar flow therethrough to induce turbulent flow to facilitate complete and consistent mixing of the foam and the wet mix to generate uniformly mixed (or homogeneous) wet cellular concrete. In other implementations, the static mixer is not necessary as turbulent flow of the wet mix and the foam output from the foam generator 130 naturally occurs and a minimum length of hose following the in-line combination is present. This may be sufficient to adequately mix the foam with the wet mix to form the wet cellular concrete without the static mixer.

FIG. 2 illustrates an example cellular concrete wet mixing system schematic 200 according to the presently disclosed technology. The system 200 includes a hopper 202 within which a dry mix is stored. The dry mix is pumped into the hopper 202 from a dry mix source 201, as illustrated by solid arrow 250. The hopper 202 may include a dust-containment system 204 oriented at the side of the hopper 202. The hopper 202 is under positive pressure while being pneumatically filled and dirty air passes through the dust-containment system 204 before exiting the dust-containment system 204 to make room within the hopper 202 for the input dry mix. Dirty air is illustrated as entering the dust-containment system 204 by dotted arrow 252, while clean air is illustrated as exiting the dust-containment system 204 to atmosphere by arrow dotted 254.

The dust-containment system 204 may include a mechanism to periodically clear collected dry mix from associated bags/cartridges. Air compressor and storage tank assembly 205 may provide compressed air (illustrated by dotted arrow 256) for the periodic pneumatic pulse of the bags/cartridges within the dust-containment system 204, for example. The cleared dry mix falls to the bottom of the dust-containment system 204 and a screw conveyor 206 transports the collected dry mix back to the hopper 202, as illustrated by solid arrow 258.

The hopper 202 may sit on hopper load cells 238 to monitor weight, which is equated to an approximate fill state of the hopper 202 based on a known weight per unit volume of the dry mix, a known empty weight of the hopper 202, and a volumetric capacity of the hopper 202. The fill state is monitored and controlled by a blend controller 240 to keep the hopper 202 within a predetermined fill state range and prevent overfill and empty conditions. Dry mix may be added and/or withdrawn periodically or continuously, perhaps with variable rates, in a manner to keep the fill state within the predetermined range. Data connections (signal and/or control) between the blend controller 240 and at least the dry mix source 201 (to control input of dry mix to the hopper 202), the hopper 202 (to monitor fill state of the hopper 202), and one or more hopper discharge screw conveyors 208 (to control output of dry mix from the hopper 202) are illustrated by dotted arrows.

The hopper discharge screw conveyor(s) 208 at a discharge of the hopper 202 selectively transport the dry mix from the hopper 202 to one or more mixing tanks 210, as illustrated by solid arrows 260. Water is pumped via water pump 242 from a water tank 213 to the mixing tank(s) 210, as illustrated by solid arrows 268. The mixing tank(s) 210 and one or more circulation pumps 212 sit on one or more mixing load cells 241 to monitor combined weight of the dry mix fed from the hopper 202 and water pumped from the water tank 213 within the mixing tank(s) 210. The mixing tank(s) 210 and circulation pump(s) 212 may be either run sequentially or simultaneously, but as independent pairings for system 200 redundancy. Operation of a singular mixing tank and circulation pump is described in detail below, with additional pairings of mixing tanks and pumps operating substantially the same.

The blend controller 240 first runs the water pump 242 (e.g., via powering the water pump 242 and/or actuating an associated solenoid-controlled valve) to fill of the mixing tank(s) 210 with a desired quantity of water from the water tank 213. The blend controller 240 determines the quantity of water that actually fills the mixing tank(s) 210 once the filling stops based on a difference between the initial weight and a final weight of the mixing tank(s) 210/circulation pump(s) 212 and a known weight per unit volume of the water using the mixing load cells 241. This ensures an accurate measurement of the actual quantity of water that was added to the mixing tank(s) 210, which may vary somewhat from the quantity of water called for by the blend controller 240.

Once the mixing tank(s) 210 are filled with water (or as the mixing tank(s) 210 are being filled with water), the circulation pump(s) 212 circulate the water within the mixing tank(s) 210 as dry mix is input into the mixing tank(s) 210 from the screw conveyor(s) 208. The actual measured water quantity added to the mixing tank(s) 210 is used by the blend controller 240 to calculate a desired quantity of dry mix to be added to the mixing tank(s) 210 based on a desired mixing ratio for a desired wet mix. The screw conveyor(s) 208 are run (e.g., by powering the screw conveyor(s) 208, perhaps at fixed or variable speed) by the blend controller 240 to deliver the desired quantity of dry mix to the mixing tank(s) 210. The mixing load cells 241 monitor the input quantity of dry mix as it fills the mixing tank(s) 210 in order for the blend controller 240 to determine when to slow and stop the screw conveyor(s) 208. In various implementations, the screw conveyor(s) 208 are controlled by the blend controller 240 to input an actual quantity of dry mix that exceeds the desired mixing ratio by as small a quantity as possible to achieve at least a desired compressive strength of a resulting cellular concrete placement, but no less. In other implementations, if too much dry mix is input, the blend controller 240 may call for a small quantity of additional water to be added to the mixing tank(s) 210 to achieve the desired mixing ratio of the wet mix.

Mixing dust containment system 214 is connected to the mixing tank(s) 210 via flexible ductwork (not shown) and includes an array of filtration bags or cartridges to contain dust within the mixing tank(s) 210. The mixing tank(s) 210 are generally under positive pressure when being filled with water or dry mix and dirty air (illustrated by dotted arrow 270) passes through the bags/cartridges before exiting the dust-containment system 214 as clean air (illustrated by dotted arrow 272) to make room for the water/dry mix. The mixing dust containment system 214 may include a mechanism to periodically clear collected dry mix from the bags/cartridges (e.g., a periodic pneumatic pulse using compressed air from the air compressor and storage tank assembly 205, as illustrated by dotted arrow 256, or a vibration mechanism). The cleared dry mix falls back into the mixing tank(s) 210 via the same flexible ductwork, as illustrated by solid arrow 274.

The flexible ductwork may serve as both the input of dirty air into the mixing dust containment system 214 and output of filtered dry mix from the mixing dust containment system 214 back into the mixing tank(s) 210. The junction of the flexible ductwork with the mixing tank(s) 210 may be oriented such that a vortex of mixing water/dry mix circulating within the mixing tank(s) 210 passes below and flows across the flexible ductwork, which naturally creates a localized negative pressure at the exit of the mixing tank(s) 210 into the flexible ductwork. This localized negative pressure aids in minimizing the dirty air exiting the mixing tank(s) 210 into the mixing dust containment system 214. In some implementations, the mixing tank(s) 210 includes a diverter in front of the flexible ductwork within the mixing tank(s) 210 to aid in creating the localized negative pressure at the exit of the mixing tank(s) 210 into the flexible ductwork.

Each of the circulation pump(s) 212 includes an input (illustrated by dot dash arrow 276) from the bottom of a respective one of the mixing tank(s) 210, and an output (illustrated by dot dash arrow 278) that tees, one flow path leading to back to the associated one of the mixing tank(s) 210 (illustrated by dot dash arrow 281), and the other flow path leading to one or more holding tanks 215 (illustrated by dot dash arrow 283). Each of the two output flow paths from one of the circulation pump(s) 212 is equipped with one of shut-off valves 216, 218 that selectively stops the flow of wet mix though that path.

For example, when operating in a recirculation mode, shut-off valve 216 leading from the circulation pump(s) 212 to the mixing tank(s) 210 is open, while shut-off valve 218 leading from the circulation pump(s) 212 to the holding tank(s) 215 is closed. When operating in a discharge mode, shut-off valve 216 leading from the circulation pump(s) 212 to the mixing tank(s) 210 is closed, while shut-off valve 218 leading from the circulation pump(s) 212 to the holding tank(s) 215 is open. The mixing load cells 241 are monitored and all of the circulation pump(s) 212 and the shut-off valves (e.g., shut-off valves 216, 218) are controlled by the blend controller 240 depending on the desired mode of operation of the mixing tank(s) 210 and associated pumps (e.g., pumps 212, 242) and valves (e.g., shut-off valves 216, 218), as illustrated by dotted lines leading from the foregoing system 200 components to the blend controller 240.

The holding tank(s) 215 also sit on holding load cells 244 to monitor weight of the wet mix fed from the mixing tank(s) 210, and thus the state of fill of the holding tank(s) 215. The blend controller 240 also directs maximum and minimum weight requirements for the holding tank(s) 215 to prevent overfilling and discharge pump cavitation, respectively, as well as detect a potential problem with filling and/or discharging the holding tank(s) 215, as described above with reference to mixing tank(s) 210. When the wet mix is ready to be discharged from the holding tank(s) 215, it is pumped out using one or more wet mix pumps 236, as illustrated by dot dash arrow 278. The holding load cells 244 are monitored and all of the wet mix pumps 236 and any associated shut-off valves are controlled by the blend controller 240 depending on whether the system 200 is to discharge wet mix, and at what rate, as illustrated by dotted lines leading from the foregoing system 200 components to the blend controller 240.

The cellular concrete wet mixing system 200 further includes a foam generator 230 that mixes a predetermined quantity of air, water, and a foam concentrate (illustrated by arrows 262, 264, 266, respectively), and blends the three together to generate a pumpable, semi-stable foam (illustrated by arrow 277). In various implementations, the air is sourced from the air compressor and storage tank assembly 205, the water is sourced from the water tank 213, and the foam concentrate is sourced from a foam concentrate reservoir (not shown). In other implementations, the air and the water may be sourced from sources different than that shown.

The proportions of water, air, and foam concentrate are closely metered by the blend controller 240 using flow sensors 280, 282, 284, respectively, to generate a consistent foam out of the foam generator 230. The flow sensors 280, 282, 284 are monitored and associated metering valves within the foam generator 230 are controlled by the blend controller 240 to accurately and consistently generate the foam and output the foam at a desired rate from the foam generator 230, as illustrated by dotted lines leading from the foregoing system 200 components to the blend controller 240.

The generated foam is combined in-line with wet mix pumped out of the holding tank(s) 215. However, due to the foam being combined in-line with the wet mix and the air compressor and storage tank assembly 205 outputting compressed air, line pressure may vary substantially. As a result, the air used for the foam generator 230 may be metered with a mass-air meter 280 to account for the compressibility of the air varying quantity that is mixed with the water and the foam concentrate. In this calculation, the water and the foam concentrate are assumed to be substantially incompressible materials within the projected line pressure, thus the flow sensors or meters 282, 284 for the water and foam concentrate may be volumetric.

Further, as the air is compressed using the air compressor and storage tank assembly 205, significant moisture may condensate on in-line internal surfaces downstream of the air compressor and storage tank assembly 205, such as sensor components of the mass-air meter 280. As mass-air meters can be susceptible to inaccuracy and/or failure caused by condensation, in one implementation, the mass-air meter 280 is placed upstream of the air compressor and storage tank assembly 205 on a dedicated line that feeds directly to a metering valve associated with the mass-air meter 280. The metering valve associated with the mass-air meter 280 may still be located downstream of the air compressor and storage tank assembly 205 as it is less susceptible to failure due to in-line moisture. As moisture within uncompressed air is less likely to condensate out of the uncompressed air, the mass-air meter 280 is less susceptible to moisture within the air, but the metering valve is still located in an appropriate location for accurate metering of the air to the foam generator 230.

In some implementations, the pumped wet mix is combined with the foam output from the foam generator 230 upstream of a static mixer 232. A minimum ratio of generated foam to wet mix combined in-line is selected such that there is sufficient wet mix to at least fully coat the bubbles suspended within the generated foam. Using less generated foam will lend to the wet mix capturing too much moisture from the generated foam during a curing process, which leads to bubble collapse, which in turn leads to collapse of a corresponding cellular concrete placement.

The unmixed wet mix and foam is pumped through the static mixer 232 to achieve and output a uniformly mixed wet cellular concrete, as illustrated by solid arrow 248. The static mixer 232 is carefully selected to adequately mix the foam with the wet mix in a uniform emulsion without substantially breaking down the bubbles within the foam. More specifically, the static mixer 232 may be sized to achieve an average droplet size for mixing an emulsion equal to or greater than an average bubble size of the foam defined by the foam generator 230, at a desired flow rate of the wet mix through the static mixer 232. By selecting the static mixer 232 to achieve an average emulsion blending droplet size that is equal to or greater than a nominal bubble size of the foam, action of the static mixer 232 on the foam breaking and dispersing individual bubbles within the foam is minimized. Further, the static mixer 232 may also be sized to achieve an average droplet size for mixing an emulsion no more than 20% greater than the average bubble size of the foam. By selecting the static mixer 232 to achieve an average emulsion blending droplet size that is no more than 20% greater than the average bubble size of the foam, mixing effectiveness of the static mixer 232 on the wet mix and the foam is maximized. As a result, in at least one implementation, the static mixer 232 is selected to achieve an average droplet size for mixing an emulsion that is 0-20% of an average bubble size of the foam defined by the foam generator 230.

In various implementations, the wet cellular concrete output from the static mixer 232 has an average bubble size (diameter) between ⅛" and 1/16," which encompasses 50-60% of the bubbles within the wet cellular concrete. A substantially equal portion (e.g., 25-30%) of the bubbles are larger and smaller than ⅛"-1/16." Achieving and maintaining a majority of the bubbles between ⅛" and 1/16" permits the cellular concrete disclosed herein to substantially outperform prior art cellular concrete placements in terms of average compressive strength for equivalent material densities. Further, fully hydrating and mixing the cellular concrete particles using the static mixer 232 sized as described above further contributes to the cellular concrete disclosed herein substantially outperforming prior art cellular concrete placements in terms of average compressive strength for equivalent material densities. For example, for a 30 lb./ft$^3$ sample, prior art cellular concrete placements may achieve 140-150 psi compressive strength, while a fully cured cellular concrete placement using the system 200 may achieve 180-190 psi compressive strength. In another example implementation, fully cured cellular concrete placements using the system 200 may achieve 20-40% greater compressive strength that prior art cellular concrete placements of similar densities.

In other implementations, the static mixer 232 is omitted as turbulent flow of the wet mix and the foam output from the foam generator 230 naturally occurs and a minimum length of hose following the in-line combination is present. This may be sufficient to adequately mix the foam with the wet mix to form the wet cellular concrete without the static mixer.

The blend controller 240 is a computing system suitable for performing the aforementioned monitoring and controlling operations of the various components of the system 200. More specifically, the blend controller 240 includes major subsystems such as a processor 285, system storage 286

(such as random-access memory (RAM) and read-only memory (ROM)), an input/output (I/O) controller 287, removable storage (such as a memory card) 288, a power supply 289, and external devices such as a display screen 290 connected via a display adapter 291, and various input peripherals 292 (e.g., a mouse, trackpad, keyboard, touchscreen, joystick, and/or smart card acceptance device). Wireless interface 293 together with a wired network interface 294, may be used to interface to various components of the system 200 and/or a local or wide area network (such as the Internet) using any network interface system known to those skilled in the art. By using computer-controlled blending (via blend controller 240), as well as highly accurate measuring techniques as described above, the wet cellular concrete output from the static mixer 232 is able to achieve blending precision 5× greater than typical prior art cellular concrete blending equipment.

Many other devices or subsystems (not shown) may be connected in a similar manner (e.g., servers, personal computers, tablet computers, smart phones, mobile devices, etc.). Also, it is not necessary for all of the components depicted in FIG. 2 to be present to practice the presently disclosed technology. Furthermore, devices and components thereof may be interconnected in different ways from that shown in FIG. 2. Code (e.g., computer software, including mobile applications (apps) to implement the presently disclosed technology may be operably disposed in the system storage 286 and/or the removable storage 288.

The blend controller 240 may include a variety of tangible computer-readable storage media (e.g., the system storage 286 and/or the removable storage 288) and intangible computer-readable communication signals. Tangible computer-readable storage can be embodied by any available media that can be accessed by the blend controller 240 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information, and which can be accessed by the blend controller 240.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

Figure 3:
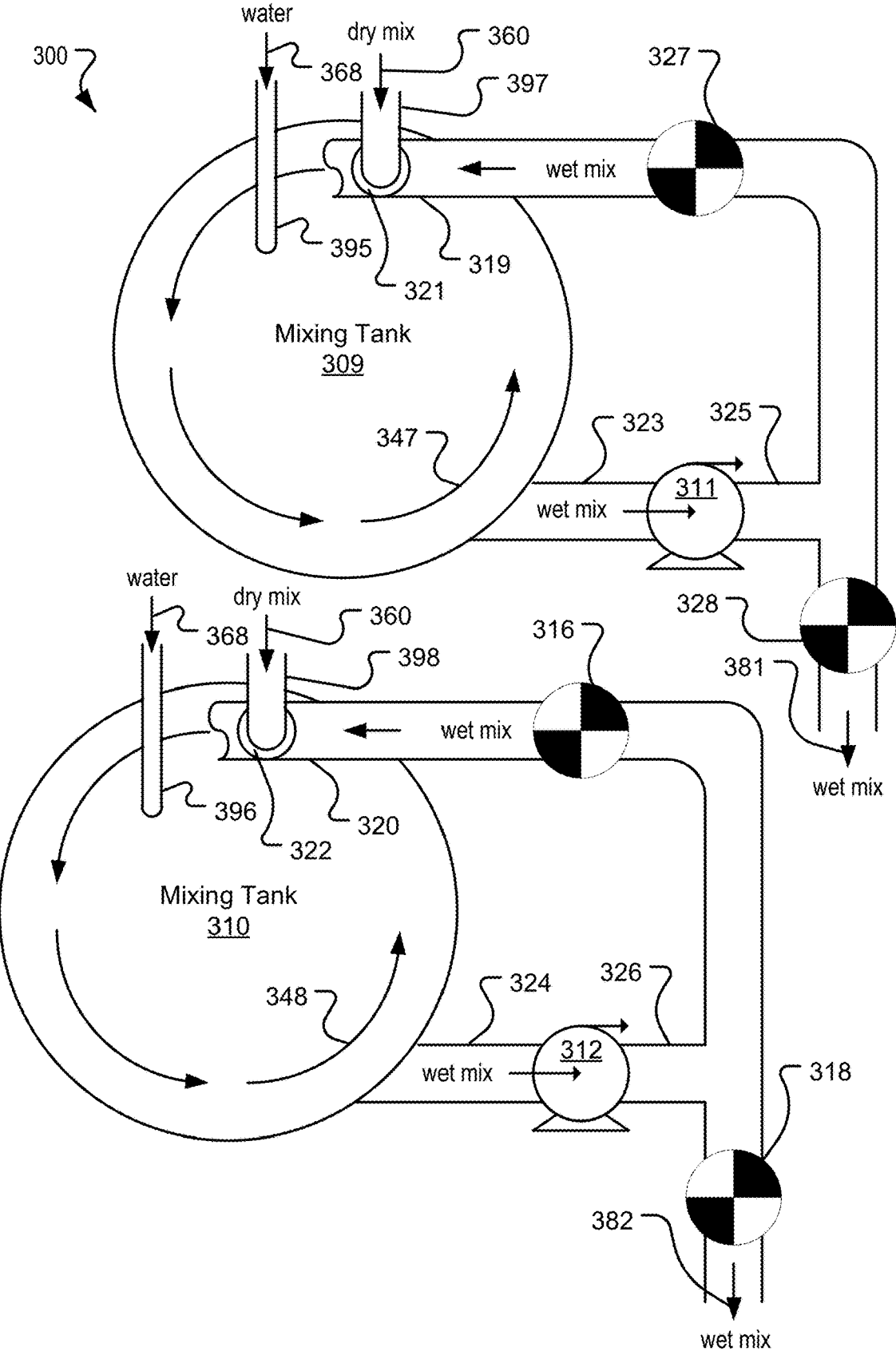
FIG. 3 illustrates a plan-view system schematic of an example mixing tank arrangement for a cellular concrete wet mixing system according to the presently disclosed technology.

FIG. 3 illustrates a plan-view system schematic of an example mixing tank arrangement 300 for a cellular concrete wet mixing system according to the presently disclosed technology. The mixing tank arrangement 300 includes inputs 397, 398 of dry mix from a discharge of a dry mix hopper (not shown, see e.g., hopper 202 of FIG. 2) to each of two mixing tanks 309, 310, as illustrated by solid arrows 360. Water is pumped via water pump (not shown, see e.g., water pump 242 of FIG. 2) from a water tank (not shown, see e.g., water tank 213 of FIG. 2) to the mixing tank(s) 309, 310 through water inputs 395, 396, respectively, as illustrated by arrows 368. In some implementations, an external water source is provided in place of the water tank. The mixing tanks 309, 310 and associated circulation pumps 311, 312 sit on one or more mixing load cells (not shown, see e.g., mixing load cells 241 of FIG. 2) to monitor combined weight of the dry mix fed from the hopper and water pumped from the water tank within the mixing tanks 309, 310. One or both of the illustrated pairings of the mixing tanks 309, 310 and the circulation pumps 311, 312 may be either run sequentially or simultaneously, but as independent pairings for mixing tank arrangement 300 redundancy.

A blend controller (not shown, see e.g., blend controller 240 of FIG. 2) first runs the water pump (e.g., via powering the water pump and/or actuating an associated solenoid-controlled valve) to fill one or both of the mixing tanks 309, 310 via input lines 395, 396, respectively, with a desired quantity of water from the water tank. The blend controller determines the quantity of water that actually fills the mixing tanks 309, 310 once the filling stops based on a difference between the initial weight and a final weight of the mixing tanks 309, 310/circulation pumps 311, 312 and a known weight per unit volume of the water using the mixing load cells. This ensures an accurate measurement of the actual quantity of water that was added to the mixing tanks 309, 310, which may vary somewhat from the quantity of water called for by the blend controller.

Once one or both of the mixing tanks 309, 310 are filled with water (or as one or both of the mixing tanks 309, 310 are being filled with water), the circulation pumps 311, 312 circulate the water within the mixing tanks 309, 310 as dry mix is input into one or both of the mixing tanks 309, 310. Specifically, an outlet 319 of the circulation pump 311 is positioned along an inner wall of the mixing tank 309 and oriented such that the output from the circulation pump 311 is directed along the inner wall of the mixing tank 309. Further, the outlet 319 of the circulation pump 311 is oriented near the top of the mixing tank 309 and directly below the dry mix input 397, thereby directing flow across the dry mix input 397 and into the mixing tank 309. In some implementations, the outlet 319 of the circulation pump 311 includes a nozzle that further directs and/or accelerates the flow output from the circulation pump 311.

The circulation pump 311, and positioning and orientation of the outlet 319 within the mixing tank 309 causes a vortex action within the mixing tank 309, as illustrated by circulation arrows (e.g., arrow 347) within the mixing tank 309. Further, the outlet 319 position directing flow across the dry mix input 397 may cause a slight vacuum on the dry mix input 397 due to the venturi effect. As a result, the dry mix is introduced into the mixing tank 309 at a high velocity that aids in complete and consistent mixing of the dry mix with the water, minimization of dust creation at the point of interaction of the dry mix with the water, and minimization of dry mix buildup on interior surfaces of the mixing tank 309. In various implementations, the outlet 319 extending into the mixing tank 309 covers the dry mix input 397 into the mixing tank 309, as shown, but includes an aperture 321 that extends through the outlet 319 and is oriented vertically in line with the dry mix input 397. This permits the dry mix to fall straight into the tank 309 rather than plug the outlet 319 should the water circulating within the tank 309 be interrupted (e.g., due to a failure of the circulation pump 311).

Similarly, an outlet 320 of the circulation pump 312 is positioned along an inner wall of the mixing tank 310 and oriented such that the output from the circulation pump 312 is directed along the inner wall of the mixing tank 310. Further, the outlet 320 of the circulation pump 312 is oriented near the top of the mixing tank 310 and directly below the dry mix input 398, thereby directing flow across the dry mix input 398 and into the mixing tank 310. In some implementations, the outlet 320 of the circulation pump 312 includes a nozzle that further directs and/or accelerates the flow output from the circulation pump 312.

The circulation pump 312, and positioning and orientation of the outlet 320 within the mixing tank 310 causes a vortex action within the mixing tank 310, as illustrated by circulation arrows (e.g., arrow 348) within the mixing tank 310. Further, the outlet 320 position directing flow across the dry mix input 398 may cause a slight vacuum on the dry mix input 398 due to the venturi effect. As a result, the dry mix is introduced into the mixing tank 310 at a high velocity that aids in complete and consistent mixing of the dry mix with the water, minimization of dust creation at the point of interaction of the dry mix with the water, and minimization of dry mix buildup on interior surfaces of the mixing tank 310. In various implementations, the outlet 320 extending into the mixing tank 310 covers the dry mix input 398 into the mixing tank 310, as shown, but includes an aperture 322 that extends through the outlet 320 and is oriented vertically in line with the dry mix input 398. This permits the dry mix to fall straight into the tank 310 rather than plug the outlet 320 should the water circulating within the tank 310 be interrupted (e.g., due to a failure of the circulation pump 312).

The actual measured water quantity added to one or both of the mixing tanks 309, 310 is used by the blend controller to calculate a desired quantity of dry mix to be added to the mixing tanks 309, 310 based on a desired mixing ratio for a desired wet mix (e.g., a 0.5 water to dry mix ratio, such as 300 pounds of water and 600 pounds of dry mix). Dry mix delivered via the dry mix inputs 397, 398 is controlled by the blend controller and the mixing load cells monitor the input quantity of dry mix as it fills the mixing tanks 309, 310 in order for the blend controller to determine when to slow and stop the delivery of dry mix. In various implementations, the delivery of dry mix is controlled by the blend controller to input an actual quantity of dry mix that exceeds the desired mixing ratio by as small a quantity as possible to achieve at least a desired compressive strength of a resulting cellular concrete placement, but no less. In other implementations, if too much dry mix is input, the blend controller may call for a small quantity of additional water to be added to the mixing tanks 309, 310 via the water inputs 395, 396 to achieve the desired mixing ratio of the wet mix.

The circulation pump 311 includes a pump input 323 drawing wet mix from the bottom of the mixing tank 309, and a pump output 325 that tees, one flow path leading to back to the mixing tank 309 and terminating at the outlet 319, and the other flow path leading to one or more holding tanks (not shown, see e.g., holding tanks(s) 215 of FIG. 2), as illustrated by arrow 381. Each of the two output flow paths from the circulation pump 311 is equipped with one of shut-off valves 327, 328 that selectively stops the flow of wet mix though that path. Similarly, the circulation pump 312 includes a pump input 324 drawing wet mix from the bottom of the mixing tank 310, and a pump output 326 that tees, one flow path leading to back to the mixing tank 310 and terminating at the outlet 320, and the other flow path leading to one or more holding tanks, as illustrated by arrow 382. Each of the two output flow paths from the circulation pump 312 is equipped with one of shut-off valves 316, 318 that selectively stops the flow of wet mix though that path.

For example, when operating the mixing tank 309 in a recirculation mode, shut-off valve 327 leading from the circulation pump 311 to the mixing tank 309 is open, while shut-off valve 328 leading from the circulation pump 311 to the holding tank(s) is closed. For further example, when operating the mixing tank 310 in a discharge mode, shut-off valve 316 leading from the circulation pump 312 to the mixing tank 310 is closed, while shut-off valve 318 leading from the circulation pump 312 to the holding tank(s) is open. In various implementations, the mixing tank 309 may be operated in a recirculation mode, while the mixing tank 310 is operated in discharge mode, as described above. In other implementations, the mixing tank 310 may be operated in a recirculation mode, while the mixing tank 309 is operated in discharge mode or both of the mixing tanks 309, 310 may be operated in recirculation mode or discharge mode simultaneously, as directed by the blend controller. In various implementations, to accurately monitor the volume of material in the mixing tanks 309, 310 and the holding tank(s) and transfers therebetween, only one of shut-off valves 327, 328 leading from the circulation pump 311 and only one of shut-off valves 316, 318 leading from the circulation pump 312 may be open at a time. The mixing load cells are monitored and the circulation pump(s) 311, 312 and the shut-off valves 327, 328, 316, 318 are controlled by the blend controller depending on the desired mode of operation of the mixing tank arrangement 300.

FIG. 4 illustrates example operations 400 for operating a cellular concrete wet mixing system according to the presently disclosed technology. A first controlling operation 405 controls a fill state within a dry mix hopper between a maximum and a minimum level. The dry mix hopper stages dry mix for use within the cellular concrete wet mixing system. Controlling the fill state of the dry mix hopper includes monitoring weight of the dry mix hopper using a hopper load cell set to determine the fill state of the dry mix hopper and directing one or both of dry mix input to the dry mix hopper and dry mix output from the dry mix hopper to control the fill state of the dry mix hopper. The dry mix input to the dry mix hopper and dry mix output from the dry mix hopper are balanced to maintain the fill state within the dry mix hopper between the maximum and the minimum levels. The maximum and the minimum levels define operating limits of the dry mix hopper, above which risks an overfill condition, which could cause dry mix to spill out of the dry mix hopper and below which risks an underfill condition, which risks incomplete or inconsistent discharge of dry mix from the dry mix hopper.

A blending operation 410 blends dry mix from the dry mix hopper and water at a predetermined blending proportion within a mixing tank to form a wet mix. The mixing tank includes respective inputs for dry mix and water to achieve the predetermined blending proportion. The mixing tank further includes a circulation input (e.g., at outlets 319, 320 of FIG. 3) and a circulation output (e.g., at pump inputs 323, 324 of FIG. 3), the circulation input being directed along an interior wall of the mixing tank and oriented below the dry mix input near a top of the mixing tank. The circulation output is oriented near a bottom of the mixing tank. When operating in a recirculation mode, which aids in effective and complete blending, wet mix from the circulation output withdrawn from the mixing tank and returned to the mixing tank at the circulation input, which generates a vortex of wet mix within the mixing tank during operation of a pump driving flow of the wet mix from the circulation output back to the circulation input.

A second controlling operation 415 controls a fill state of the mixing tank between a maximum and a minimum level. The mixing tank is used to mix the dry mix and water to create a wet mix for use within the cellular concrete wet mixing system. Controlling the fill state of the mixing tank includes monitoring weight of the mixing tank using a mixing load cell set to determine the fill state of the mixing tank and directing one or more of dry mix and water input to the mixing tank and wet mix output from the mixing tank to control the fill state of the mixing tank. The dry mix and water inputs to the mixing tank and the wet mix output from the mixing tank are balanced to maintain the fill state within the mixing tank between the maximum and the minimum levels. The maximum and the minimum levels define operating limits of the mixing tank, above which risks an overfill condition, which could cause wet mix to spill out of the mixing tank and below which risks an underfill condition, which risks incomplete or inconsistent discharge of wet mix from the mixing tank. Discharged wet mix from the mixing tank is pumped to a holding tank.

A third controlling operation 420 controls a fill state of a holding tank storing a quantity of the wet mix between a maximum and a minimum level. The holding tank is used to stage wet mix for use within the cellular concrete wet mixing system. Controlling the fill state of the holding tank includes monitoring weight of the holding tank using a holding load cell set to determine the fill state of the holding tank and directing one or more of wet mix input to the holding tank and wet mix output from the holding tank to control the fill state of the holding tank. The wet mix input to and output from the holding tank are balanced to maintain the fill state within the holding tank between the maximum and the minimum levels. The maximum and the minimum levels define operating limits of the holding tank, above which risks an overfill condition, which could cause wet mix to spill out of the holding tank and below which risks an underfill condition, which risks incomplete or inconsistent discharge of wet mix from the holding tank.

A generating operation 425 generates foam from air, water, and foam concentrate. In various implementations, generating the foam uses a combination of mass-flow metered air, volumetrically metered water, and volumetrically metered foam concentrate. A combining operation 430 combines the wet mix and the foam in line at a predetermined combining proportion to generate a foamed wet mix. In various implementations, the wet mix and the foam are mixed at a static mixer oriented in line and downstream of a combined stream of the foam and the wet mix to generate the foamed wet mix.

The foamed wet mix may be characterized as a uniformly mixed wet cellular concrete including an array of consistently sized stable bubbles suspended within the wet mix, each bubble substantially entirely coated with wet mix (e.g., 90+% of the bubbles coated about their entirety), which lends additional compressive strength to the wet cellular concrete. The consistently sized stable bubbles are also 90+% separate bubbles (or less than 10% merged bubbles, as evidenced by a merged non-spherical shape).

Foamed cellular concrete produced by the cellular concrete wet mixing system disclosed herein may have dry densities of 400 to 1600 kg/m$^3$, with 7-day strengths of approximately 1 to 10 N/mm$^2$, respectively, depending on the application. While the placed cellular concrete product is considered a form of concrete (with air bubbles supplementing or replacing aggregate), its high thermal and acoustical insulating qualities make it useful for different applications than conventional concrete.

A few example applications of cellular concrete produced by the cellular concrete wet mixing system disclosed herein are: bridge approaches/embankments, pipeline abandonment/annular fill, trench backfill, precast blocks, precast wall elements/panels, cast-in-situ/cast-in-place walls, insulating compensation laying, insulation floor screeds, insulation roof screeds, sunken portion filling, trench reinstatement, sub-base in highways, filling of hollow blocks, prefabricated insulation boards, and so on.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A cellular concrete wet mixing system comprising:
a dry mix hopper to store a quantity of dry mix;
a mixing tank to blend the dry mix and water together to form a wet mix;
a holding tank to store a quantity of the wet mix;
a foam generator to generate foam from air, water, and foam concentrate, the foam generator comprising:
a mass air flow meter to measure the mass of air incoming to the foam generator;
a volumetric water flow meter to measure the volume of water incoming to the foam generator; and
a volumetric foam flow meter to measure the volume of foam concentrate incoming to the foam generator;
a blend controller configured to:
control a fill state of the dry mix hopper between a maximum and a minimum level;
define a blending proportion of the dry mix and the water within the mixing tank;
control a fill state of the mixing tank between a maximum and a minimum level;
control a fill state of the holding tank between a maximum and a minimum level; and
define a blending proportion of the wet mix and the foam combined in-line to generate a foamed wet mix, the dry mix hopper, the mixing tank, the holding tank, and the foam generator are all mounted on a mobile chassis; and
a dust-containment system operatively connected to the dry mix hopper, oriented at a side of the dry mix hopper, and mounted on the mobile chassis, wherein the dust-containment system includes:
an input to accept dirty air from the dry mix hopper, wherein the dirty air comprises dry mix entrained in air;
a set of filters to separate the dry mix from the dirty air;
a clean air output to atmosphere;
a clearing mechanism to periodically release dry mix that has collected on the filters, the released dry mix to fall to a bottom of the dust-containment system; and
a screw conveyor to transport the dry mix collected at the bottom of the dust-containment system back to the dry mix hopper.

2. The cellular concrete wet mixing system of claim 1, wherein the foam generator uses a combination of mass metered air, volumetrically metered water, and volumetrically metered foam concentrate to generate the foam.

3. The cellular concrete wet mixing system of claim 1, further comprising:
a static mixer oriented in line with a combined stream of the foam and the wet mix to generate the foamed wet mix.

4. The cellular concrete wet mixing system of claim 1, further comprising:
a hopper load cell set, wherein the blend controller is configured to monitor weight of the dry mix hopper using the hopper load cell set to determine the fill state of the dry mix hopper, and wherein the blend controller is configured to direct one or both of dry mix input to the dry mix hopper and dry mix output from the dry mix hopper to control the fill state of the dry mix hopper between the maximum and the minimum level.

5. The cellular concrete wet mixing system of claim 1, further comprising:
a mixing load cell set, wherein the blend controller is configured to monitor weight of the mixing tank using the mixing load cell set to determine the fill state of the mixing tank, and wherein the blend controller is configured to direct one or more of dry mix and water input to the mixing tank and wet mix output from the mixing tank to control the fill state of the mixing tank between the maximum and the minimum level.

6. The cellular concrete wet mixing system of claim 1, further comprising:
a holding load cell set, wherein the blend controller is configured to monitor weight of the holding tank using the holding load cell set to determine the fill state of the holding tank, and wherein the blend controller is configured to direct one or more of wet mix input to the holding tank and wet mix output from the holding tank to control the fill state of the holding tank between the maximum and the minimum level.

7. The cellular concrete wet mixing system of claim 1, wherein the mixing tank includes a dry mix input, a circulation input, and a circulation output, the circulation input directed along an interior wall of the mixing tank and oriented directly below the dry mix input, further comprising:
a circulation pump configured to recirculate wet mix from the circulation output to the circulation input in a recirculation flow path and generate a vortex of wet mix within the mixing tank during operation, and wherein the circulation input is configured to direct the wet mix flow across the dry mix input as the dry mix enters the mixing tank.

8. The cellular concrete wet mixing system of claim 7, wherein the circulation input includes an aperture therethrough below the dry mix input to permit the dry mix to drop through the circulation input and directly into the mixing tank when the circulation pump is not in operation.

9. The cellular concrete wet mixing system of claim 7, wherein the circulation input includes a nozzle to direct the wet mix input into the mixing tank.

10. The cellular concrete wet mixing system of claim 7, further comprising:
a first shut-off valve oriented in the recirculation flow path from the circulation pump back to the mixing tank; and
a second shut-off valve oriented in a discharge flow path from the circulation pump to the holding tank, wherein the blend controller directs only one of the first shut-off valve and the second shut-off valve to be open at any point in time.

11. A cellular concrete wet mixing system comprising:
a dry mix hopper to store a quantity of dry mix;
a mixing tank to blend the dry mix and water together to form a wet mix, wherein the mixing tank includes a dry mix input, a circulation input, and a circulation output, the circulation input directed along an interior wall of the mixing tank and oriented directly below the dry mix input;
a circulation pump configured to recirculate wet mix from the circulation output to the circulation input in a recirculation flow path and generate a vortex of wet mix within the mixing tank during operation, and wherein the circulation input is configured to direct the wet mix flow across the dry mix input as the dry mix enters the mixing tank, wherein the circulation input includes an aperture therethrough below the dry mix input to permit the dry mix to drop through the circulation input and directly into the mixing tank when the circulation pump is not in operation;

a holding tank to store a quantity of the wet mix;

a foam generator to generate foam from air, water, and foam concentrate, the foam generator comprising:

a mass air flow meter to measure the mass of air incoming to the foam generator;

a volumetric water flow meter to measure the volume of water incoming to the foam generator; and a volumetric foam flow meter to measure the volume of foam concentrate incoming to the foam generator;

a blend controller configured to:

control a fill state of the dry mix hopper between a maximum and a minimum level;

define a blending proportion of the dry mix and the water within the mixing tank;

control a fill state of the mixing tank between a maximum and a minimum level;

control a fill state of the holding tank between a maximum and a minimum level; and define a blending proportion of the wet mix and the foam combined in-line to generate a foamed wet mix, the dry mix hopper, the mixing tank, the holding tank, and the foam generator are all mounted on a mobile chassis.

12. The cellular concrete wet mixing system of claim 11, wherein the foam generator uses a combination of mass metered air, volumetrically metered water, and volumetrically metered foam concentrate to generate the foam.

13. The cellular concrete wet mixing system of claim 11, further comprising:

a static mixer oriented in line with a combined stream of the foam and the wet mix to generate the foamed wet mix.

14. A method of operating a cellular concrete wet mixing system comprising:

controlling a fill state within a dry mix hopper between a maximum and a minimum level;

blending dry mix from the dry mix hopper and water at a predetermined blending proportion within a mixing tank to form a wet mix;

controlling a fill state of the mixing tank between a maximum and a minimum level;

controlling a fill state of a holding tank storing a quantity of the wet mix between a maximum and a minimum level;

generating foam from air, water, and foam concentrate using a foam generator, the foam generator comprising:

a mass air flow meter to measure the mass of air incoming to the foam generator;

a volumetric water flow meter to measure the volume of water incoming to the foam generator; and a volumetric foam flow meter to measure the volume of foam concentrate incoming to the foam generator;

combining the wet mix and the foam in line at a predetermined combining proportion to generate a foamed wet mix, the dry mix hopper, the mixing tank, the holding tank, and the foam generator are all mounted on a mobile chassis; and containing dust within the cellular concrete wet mixing system using a dust-containment system operatively connected to the dry mix hopper, oriented at a side of the dry mix hopper, and mounted on the mobile chassis, wherein the dust-containment system includes:

an input to accept dirty air from the dry mix hopper, wherein the dirty air comprises dry mix entrained in air;

a set of filters to separate the dry mix from the dirty air;

a clean air output to atmosphere;

a clearing mechanism to periodically release dry mix that has collected on the filters, the released dry mix to fall to a bottom of the dust-containment system; and a screw conveyor to transport the dry mix collected at the bottom of the dust-containment system back to the dry mix hopper.

15. The method of claim 14, wherein generating the foam uses a combination of mass metered air, volumetrically metered water, and volumetrically metered foam concentrate.

16. The method of claim 14, wherein the wet mix and the foam are mixed at a static mixer oriented in line and downstream of a combined stream of the foam and the wet mix to generate the foamed wet mix.

17. The method of claim 14, wherein controlling the fill state of the dry mix hopper includes:

monitoring weight of the dry mix hopper using a hopper load cell set to determine the fill state of the dry mix hopper; and directing one or both of dry mix input to the dry mix hopper and dry mix output from the dry mix hopper to control the fill state of the dry mix hopper.

18. The method of claim 14, wherein controlling the fill state of the mixing tank includes:

monitoring weight of the mixing tank using a mixing load cell set to determine the fill state of the mixing tank; and directing one or more of dry mix and water input to the mixing tank and wet mix output from the mixing tank to control the fill state of the mixing tank.

19. The method of claim 14, wherein controlling the fill state of the holding tank includes:

monitoring weight of the holding tank using a holding load cell set to determine the fill state of the holding tank; and directing one or more of wet mix input to the holding tank and wet mix output from the holding tank to control the fill state of the holding tank.

20. The method of claim 14, wherein the mixing tank includes a dry mix input, a circulation input, and a circulation output, the circulation input directed along an interior wall of the mixing tank and oriented below the dry mix input, further comprising:

recirculating wet mix from the circulation output to the circulation input to generate a vortex of wet mix within the mixing tank during operation.

* * * * *